United States Patent
Ahn

(10) Patent No.: US 11,757,148 B2
(45) Date of Patent: Sep. 12, 2023

(54) BATTERY MODULE, AND BATTERY PACK INCLUDING THE SAME

(71) Applicant: LG Chem, Ltd., Seoul (KR)

(72) Inventor: Moon Youl Ahn, Daejeon (KR)

(73) Assignee: LG Energy Solution, Ltd.

( * ) Notice: Subject to any disclaimer, the term of this patent is extended or adjusted under 35 U.S.C. 154(b) by 129 days.

(21) Appl. No.: 17/057,883

(22) PCT Filed: Jan. 6, 2020

(86) PCT No.: PCT/KR2020/000207
§ 371 (c)(1),
(2) Date: Nov. 23, 2020

(87) PCT Pub. No.: WO2020/145600
PCT Pub. Date: Jul. 16, 2020

(65) Prior Publication Data
US 2021/0203020 A1    Jul. 1, 2021

(30) Foreign Application Priority Data
Jan. 7, 2019  (KR) .................. 10-2019-0001978

(51) Int. Cl.
*H01M 10/6554*  (2014.01)
*H01M 10/613*   (2014.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC .. H01M 10/613; H01M 10/625; H01M 10/64; H01M 10/653; H01M 10/6554;
(Continued)

(56) References Cited

U.S. PATENT DOCUMENTS

| | | |
|---|---|---|
| 2017/0373289 A1 | 12/2017 | Lee et al. |
| 2018/0019508 A1 | 1/2018 | Lee et al. |

(Continued)

FOREIGN PATENT DOCUMENTS

| | | |
|---|---|---|
| EP | 4009418 A1 | 6/2022 |
| JP | 2014093240 A | 5/2014 |

(Continued)

OTHER PUBLICATIONS

International Search Report for Application No. PCT/KR2020/000207 dated May 6, 2020, 3 pages.

*Primary Examiner* — Lingwen R Zeng
(74) *Attorney, Agent, or Firm* — Lerner David LLP

(57) ABSTRACT

A battery module according to one embodiment of the present disclosure comprises: a plurality of battery cells, a housing accommodating the plurality of battery cells, a cooling part disposed on an outer surface of the housing, and a first heat transfer part disposed on an inner surface of the housing in contact with an end of each of the plurality of battery cells, wherein the housing may have a curved portion having a curved shape conforming to a curved shape of the ends of the plurality of battery cells.

13 Claims, 6 Drawing Sheets

(51) Int. Cl.
  *H01M 10/64* (2014.01)
  *H01M 10/625* (2014.01)
  *H01M 10/653* (2014.01)
  *H01M 50/209* (2021.01)
  *H01M 50/204* (2021.01)
  *H01M 10/6556* (2014.01)

(52) U.S. Cl.
  CPC ......... *H01M 10/64* (2015.04); *H01M 10/653* (2015.04); *H01M 50/204* (2021.01); *H01M 50/209* (2021.01); *H01M 10/6556* (2015.04); *H01M 2220/20* (2013.01); *Y02E 60/10* (2013.01)

(58) Field of Classification Search
  CPC ......... H01M 10/6556; H01M 2220/20; H01M 50/20; H01M 50/209; Y02E 60/10
  See application file for complete search history.

(56) References Cited

U.S. PATENT DOCUMENTS

| | | | |
|---|---|---|---|
| 2018/0062196 A1 | 3/2018 | Eom et al. | |
| 2018/0076493 A1 | 3/2018 | Park et al. | |
| 2018/0175468 A1* | 6/2018 | Shin | H01M 10/6551 |
| 2018/0183117 A1 | 6/2018 | Cho et al. | |
| 2018/0205124 A1 | 7/2018 | Lee et al. | |
| 2018/0269548 A1 | 9/2018 | Chi et al. | |
| 2018/0287226 A1 | 10/2018 | Yoo et al. | |
| 2018/0366794 A1* | 12/2018 | Kim | H01M 10/613 |
| 2018/0375077 A1 | 12/2018 | Shin et al. | |
| 2020/0185797 A1 | 6/2020 | Park et al. | |

FOREIGN PATENT DOCUMENTS

| | | |
|---|---|---|
| JP | 2018502431 A | 1/2018 |
| JP | 2018507512 A | 3/2018 |
| JP | 2018519624 A | 7/2018 |
| JP | 2019502232 A | 1/2019 |
| JP | 6681911 B2 | 4/2020 |
| KR | 20140074151 A | 6/2014 |
| KR | 20160105358 A | 9/2016 |
| KR | 20160108960 A | 9/2016 |
| KR | 20160146587 A | 12/2016 |
| KR | 20160149604 A | 12/2016 |
| KR | 20170070795 A | 6/2017 |
| KR | 20170135473 A | 12/2017 |
| KR | 20170140693 A | 12/2017 |
| KR | 20180020547 A | 2/2018 |
| KR | 20180047383 A | 5/2018 |
| WO | 2016137303 A1 | 9/2016 |
| WO | 2016159549 A2 | 10/2016 |
| WO | 2017052104 A1 | 3/2017 |
| WO | 2017104878 A1 | 6/2017 |
| WO | 2017160029 A1 | 9/2017 |
| WO | 2021024776 A1 | 2/2021 |

* cited by examiner

[FIG. 1]
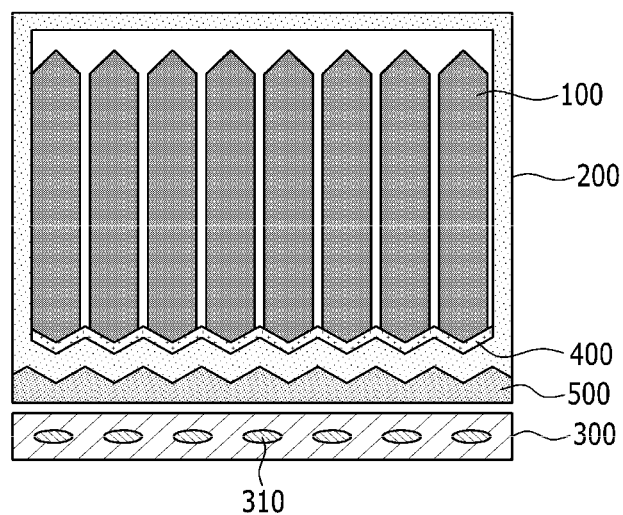

【FIG. 2】
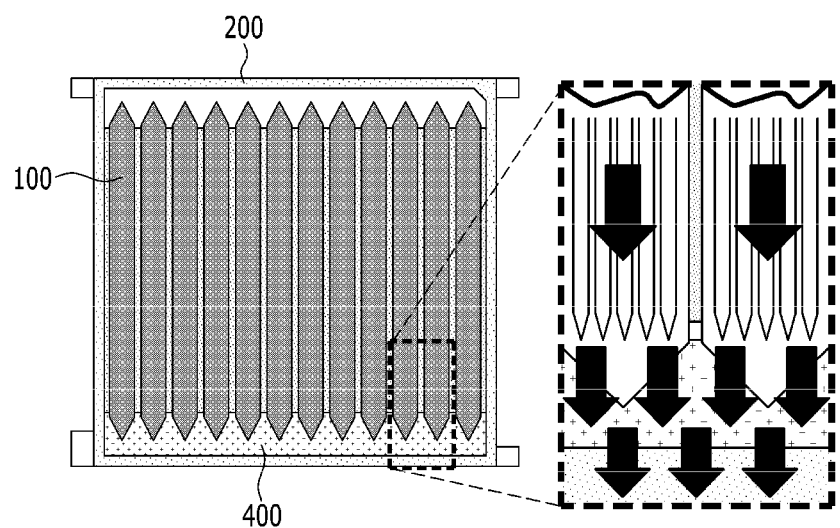
【FIG. 3】
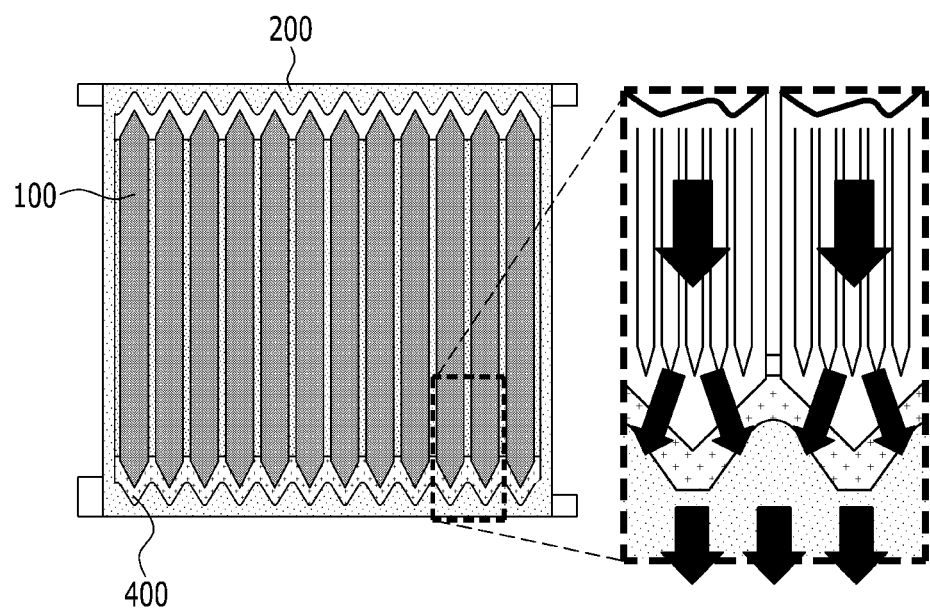

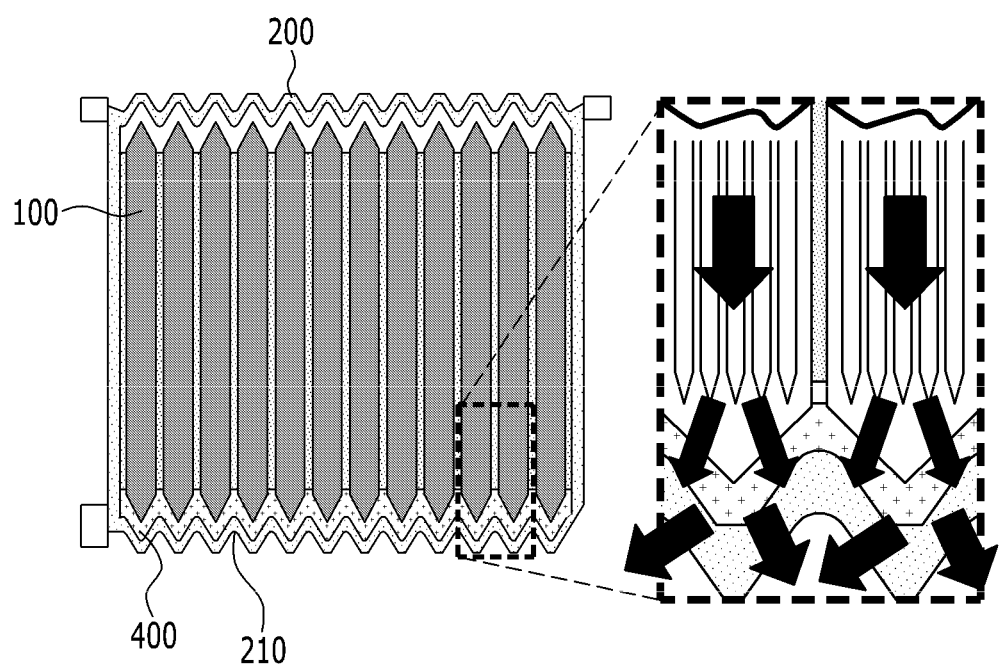
【FIG. 4】

[FIG. 5]
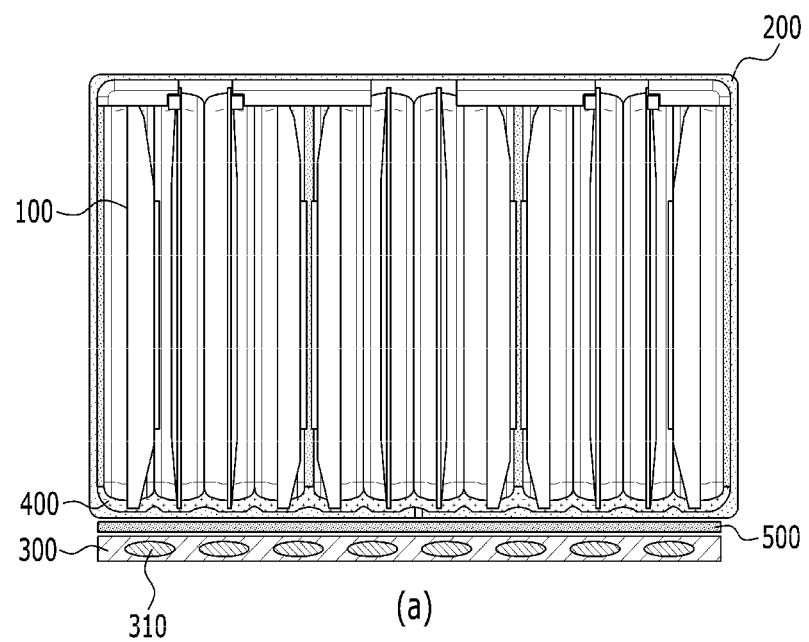
(a)
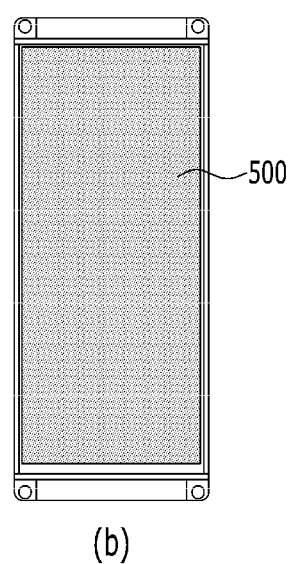
(b)

[FIG. 6]
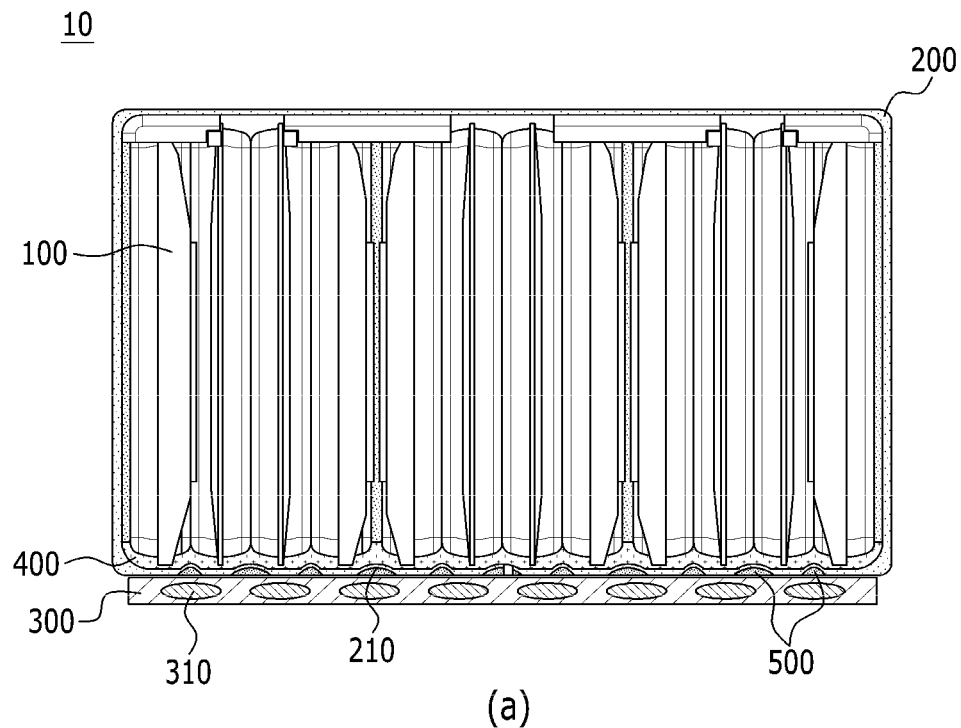
(a)
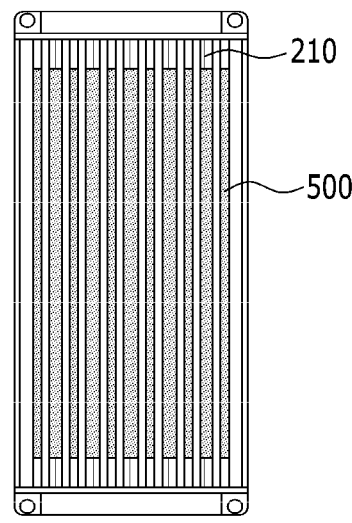
(b)

[FIG. 7]
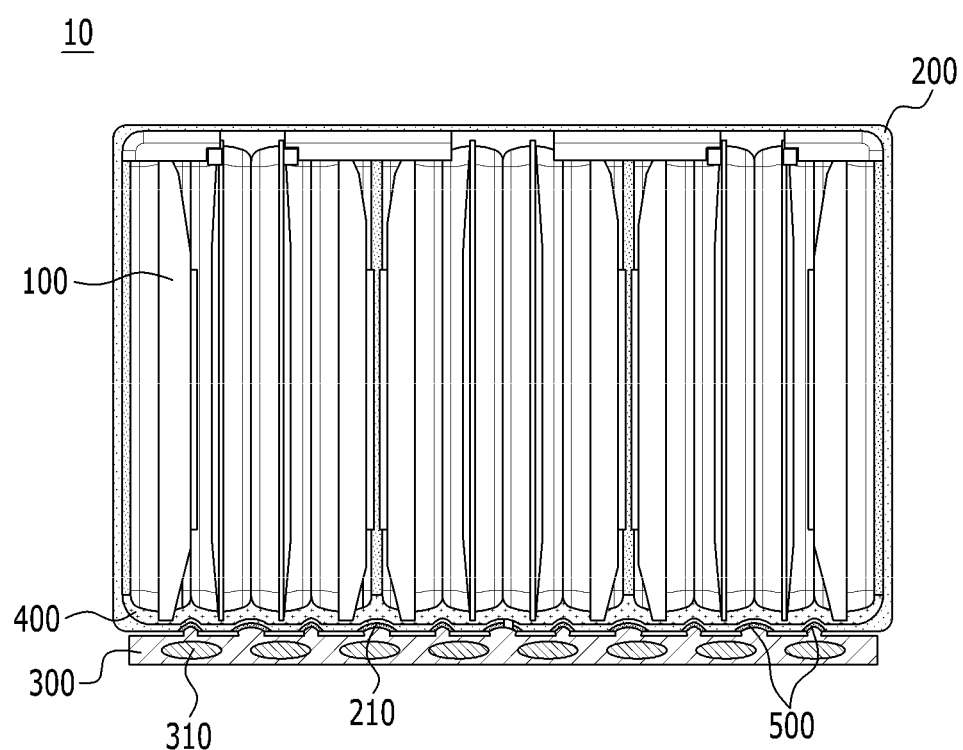

BATTERY MODULE, AND BATTERY PACK INCLUDING THE SAME

REFERENCE TO RELATED APPLICATION(S)

This application is a national phase entry under 35 U.S.C. § 371 of International Application No. PCT/KR2020/000207, filed on Jan. 6, 2020, published in Korean, which claims priority to Korean Patent Application No. 10-2019-0001978 filed on Jan. 7, 2019, the disclosures of which are hereby incorporated herein by reference in their entireties.

TECHNICAL FIELD

The present disclosure relates to a battery module and a battery pack including the same, and more particularly, to a battery module having improved cooling performance, and a battery pack including the same.

BACKGROUND ART

In modern society, as portable devices such as a mobile phone, a notebook computer, a camcorder and a digital camera has been daily used, the development of technologies in the fields related to mobile devices as described above has been activated. In addition, rechargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

In the case of a secondary battery used in small appliances, two to three battery cells are disposed therein, but in the case of a secondary battery used in a medium- or large-sized device such as an automobile, a battery module having a plurality of battery cells electrically connected with each other is used.

In the case of the battery module used in such a medium- or large-sized device, in order to provide a capacity above a specific value required by the device, a plurality of battery cells are electrically connected in series with each other and used. In this case, the stability of the secondary battery itself varies depending on a method of connecting the plurality of battery cells, a method of fixing them, and the like.

In particular, in the secondary battery having increased capacity as described above, the way of cooling the battery in order to prevent a problem caused by overheating of the battery is important. It is necessary to efficiently dissipate heat inside the battery, and as a method for dissipating heat in the secondary battery, there is mentioned a method of applying a thermal interface material (TIM) on a surface coupled with the secondary battery.

The thermal interface material (TIM), also referred to as a thermal surface material, means that in a path through which heat is transferred, said material is filled between the respective surfaces to adjust a contact area of the surface through which heat is transferred and finally adjust the path of heat transfer, thereby adjusting the thermal resistance.

In order to prevent a problem caused by overheating in the secondary battery as described above, it is necessary to develop a technique for efficiently dissipating heat inside the battery to the outside of the battery.

DETAILED DESCRIPTION OF THE INVENTION

Technical Problem

Embodiments of the present disclosure are designed to solve the problems as described above, and therefore, an object of the present disclosure is to provide a battery module which improves the cooling efficiency of a secondary battery by adjusting a contacted portion in the heat transfer path in the process of transferring heat generated inside the secondary battery to a cooling part disposed outside the battery to minimize the thermal resistance, and a battery pack including the same.

However, the problem to be solved by the embodiments of the present disclosure is not limited to the above-described problems, and can be variously expanded within the scope of the technical idea included in the present disclosure.

Technical Solution

According to a feature of the present disclosure for achieving the above object, there is provided a battery module comprising: a plurality of battery cells, a housing accommodating the plurality of battery cells, and a cooling part disposed on an outer surface of the housing, wherein the battery module includes a first heat transfer part formed on an inner surface of the housing so as to make contact with one side of the plurality of battery cells, and wherein the housing may have a curved portion in accordance with a curved shape of the plurality of battery cells.

At least one of the inner surface and the outer surface of the housing may have a curved portion.

The first heat transfer part formed to make contact with the curved portion of the housing may have a curved portion formed along the curve of the housing.

The battery module further includes a second heat transfer part disposed between the outer surface of the housing and the cooling part so as to make contact with the outer surface of the housing.

The second heat transfer part may have a planar shape.

By the curve of the outer surface of the housing, the second heat transfer part may be formed inside a groove formed by the curve.

The second heat transfer part may have a rod shape.

The second heat transfer part is composed of a plurality of parts, and the plurality of second heat transfer parts may be spaced apart from each other while being inserted into a plurality of grooves formed by the curve, respectively.

The housing between the first heat transfer part and the second heat transfer part may be formed such that both the inner surface and the outer surface are curved.

The first heat transfer part may have a curved shape.

The first heat transfer part may be a conductive adhesive.

The second heat transfer part may be one of a heat dissipating grease, a conductive adhesive, and a heat dissipating pad.

In addition, according to another feature of the present disclosure for achieving the above object, there is provided a battery pack comprising a battery module, wherein the battery module comprises: a plurality of battery cells, a housing accommodating the plurality of battery cells, and a cooling part disposed on an outer surface of the housing, wherein the battery module includes a first heat transfer part formed on an inner surface of the housing so as to make contact with one side of the plurality of battery cells, and wherein the housing may have a curved portion in accordance with a curved shape of the plurality of battery cells.

Advantageous Effects

The battery module according to embodiments of the present disclosure can increase the cooling performance by using a curved shape, and efficiently dissipate the heat inside the secondary battery

BRIEF DESCRIPTION OF THE DRAWINGS

FIG. 1 is a view showing a cross section of a battery module according to one embodiment of the present disclosure.

FIG. 2 is a view illustrating a heat transfer part disposed in a battery module according to a comparative example.

FIG. 3 is a view illustrating a first heat transfer part in a battery module according to one embodiment of the present disclosure.

FIG. 4 is a view illustrating a first heat transfer part in a battery module according to another embodiment of the present disclosure.

FIG. 5 is a view illustrating a second heat transfer part in a battery module according to one embodiment of the present disclosure.

FIG. 6 is a view illustrating a second heat transfer part in a battery module according to another embodiment of the present disclosure.

FIG. 7 is a view illustrating a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a part is referred to as "including" a certain component, it means that it can further include other components, without excluding the other components, unless otherwise stated.

FIG. 1 is a view showing a cross section of a battery module according to one embodiment of the present disclosure.

As shown in FIG. 1, a battery module 10 according to one embodiment of the present disclosure includes a plurality of battery cells 100, a housing 200 accommodating the plurality of battery cells 100, and a cooling part 300 disposed on an outer surface of the housing 200 and having a refrigerant 310 flowing therein, wherein the battery module 10 includes a first heat transfer part 400 formed on an inner surface of the housing 200 so as to make contact with one side of the plurality of battery cells 100, and the housing 200 may have a curved portion in accordance with a curved shape of the plurality of battery cells 100. In addition, the battery module of the present disclosure may further include a second heat transfer part 500 which is disposed between the outer surface of the housing 200 and the cooling part 300 so as to make contact with the outer surface of the housing 200.

In FIG. 1, both the inner surface and the outer surface of the housing 200 have a curved shape, but are not limited thereto. At least one of the inner surface and the outer surface of the housing 200 in the present disclosure may have a curved portion along the curve of the plurality of battery cells 100, whereby at least one of the first heat transfer part 400 and the second heat transfer part 500 disposed to make contact with the curved portion of the housing 200 may be formed along the curve of the housing 200.

This will be described below in detail with reference to FIGS. 2 to 6.

FIG. 2 is a view illustrating a heat transfer part disposed in a battery module according to a comparative example, and FIG. 3 is a view illustrating a first heat transfer part in a battery module according to one embodiment of the present disclosure.

As shown in FIG. 2, it can be confirmed that an inner surface of the housing 200 in the battery module according to the comparative example has a planar shape. In this case, between the lower surface of the plurality of battery cells 100 and the inner surface of the flat housing 200, the first heat transfer part 400 may be formed in a shape as shown in FIG. 2. As can be seen in the enlarged drawing, when looking at the process and direction of transferring the heat generated in the battery cell 100, the direction and area in which heat is transferred from the inside of the battery cell 100 toward the outside may not be efficient as compared to FIG. 3 showing the battery module according to one embodiment of the present disclosure described below, depending on the shape of the curved battery cell 100, the shape of the first heat transfer part 400 in contact with the battery cell 100, and the shape of the portion where the first heat transfer part 400 and the housing 200 come into contact.

FIG. 3 is for illustrating the first heat transfer part 400 of the present disclosure, and it can be confirmed that the inner surface of the housing 200 has a shape curved along the curve of the battery cell 100, unlike FIG. 2. Accordingly, it can be confirmed that the first heat transfer part 400 formed between one side of the battery cell 100 and the inner surface of the housing 200 is thinly disposed along the curve of the battery cell 100, unlike FIG. 2.

As the first heat transfer part 400 is formed in a thin and curved shape in this way, a thermal resistance becomes low when the heat generated in the battery cell 100 is transferred to the outside of the housing 200 through the first heat transfer part 400. That is, as compared with the battery module shown in FIG. 2, the heat transfer path from the battery cell 100 to the first heat transfer part 400 has been reduced compared to the previous one. Further, it can be confirmed that due to the first heat transfer part 400 having the same shape as the curve of the battery cell 100, an effect of expanding the heat transfer area can also be obtained.

FIG. 4 is a view illustrating a first heat transfer part in a battery module according to another embodiment of the present disclosure.

Referring to FIG. 4, unlike the battery module of FIG. 3 in which only the inner surface of the housing 200 was curved, it can be confirmed that in FIG. 4, both the inner surface and outer surface of the housing 200 are curved along the curve of the battery cell 100.

In FIG. 3, there is an effect that the heat transfer path is reduced and the heat transfer area is increased in the process of heat transfer from the first heat transfer part 400 to the housing 200, whereas in FIG. 4, there is an effect that the heat transfer path is reduced and the heat transfer area is increased in the transfer process from the first heat transfer part 400 to the housing 200 as well as in the process of transferring heat from the housing 200 to the outside of the housing 200, which is different from FIG. 3. That is, as shown in FIG. 4, when the inner surface and the outer surface of the housing 200, and the first heat transfer part 400 disposed between one side of the battery cell 100 and the housing 200 are all curved like the battery cell 100, the thermal resistance can be minimized in the process of heat transfer from the battery cell 100 toward the outside of the housing 200.

FIG. 5 is a view illustrating a second heat transfer part in a battery module according to one embodiment of the present disclosure, and FIG. 6 is a view illustrating a second heat transfer part in a battery module according to another embodiment of the present disclosure.

FIG. 5(a) is a view showing one embodiment in which only the inner surface of the housing 200 is curved as shown in FIG. 3 and the outer surface of the housing 200 is flat-shaped. In this case, the second heat transfer part 500 disposed between the outer surface of the housing 200 and the cooling part 300 may be formed in a shape of a flat plane as shown in FIG. 5(b).

Meanwhile, FIG. 6(a) shows another embodiment in which both the inner surface and the outer surface of the housing 200 have a shape curved in accordance with the curved shape of one side of the battery cell 100. That is, it can be confirmed that in FIG. 6, the second heat transfer part 500 is disposed along the curve formed on the outer surface of the housing 200 and is different from the shape of a flat plane shown in FIG. 5.

In the housing 200 in FIG. 6, a groove 210 may be formed in parallel with the curve by the curve of the outer surface of the housing 200. As shown in FIG. 6(a), the second heat transfer part 500 is formed inside the groove 210 formed by the curve as described above. As in FIG. 6(b) showing a state in which the second heat transfer part 500 is disposed, the second heat transfer part 500 has a rod shape, and a plurality of second heat transfer parts 500 may be formed inside a plurality of grooves 210 formed by the curve, respectively. The plurality of second heat transfer parts 500 thus formed may be spaced apart from each other.

As shown in FIG. 6(a), between the first heat transfer part 400 and the second heat transfer part 500, the housing 200 may be formed to be curved in a shape having a certain thickness. In the case of the housing 200 in which both the inner surface and the outer surface have a curved shape in this way, an area cooled by the cooling part 300 disposed outside the housing 200 can be enlarged.

That is, it can be said that through the structure as above, a thermal resistance (K/W) in the process of heat transfer from the battery cell 100 to the cooling part 300 is lowered, thereby increasing the cooling efficiency through the cooling part 300. The thermal resistance (K/W) is proportional to a length (m) of the heat transfer path and inversely proportional to a thermal conductivity (W/m/K] and an area (m$^2$) of heat transfer. Accordingly, the present disclosure aims to reduce the length of the heat transfer path and increase the area of heat transfer as much as possible through the structures of FIGS. 4 and 6, thereby finally minimizing the thermal resistance.

FIG. 7 is a view illustrating a battery module according to another embodiment of the present disclosure.

As shown in FIG. 7, it can be confirmed that the second heat transfer part 500 of FIG. 7 is not a flat shape as in FIG. 5, but may be a shape formed inside the groove 210 formed outside the housing 200 as in FIG. 6. However, due to the difference between the embodiments illustrated in FIG. 7 and FIG. 6, it can be confirmed that the shape of the second heat transfer part 500 formed inside the groove 210, and the shape of the cooling part 300 disposed on one side of the second heat transfer part 500 are different.

First, the cooling part 300 shown in FIG. 7 is disposed on the outer surface of the housing 200 and may have a shape curved in accordance with the shape of the groove 210 on the outer surface of the housing 200. As such, when the cooling part 300 has a shape protruding convexly toward the groove 210 of the housing 200 at a position corresponding to the groove 210 formed on the outer surface of the housing 200, the shape of the second heat transfer part 500 formed inside the groove 210 of the housing 200 may be different due to the arrangement of the cooling part 300. That is, the second heat transfer part 500 is disposed in a space between the groove 210 having a recessed shape and the cooling part 300 having a convex shape protruding at a position corresponding thereto, and may be disposed to have a certain thickness along the space therebetween.

That is, there is a difference in that the second heat transfer part 500 in FIG. 6 has a shape disposed to fill the groove 210, whereas the second heat transfer part 500 in FIG. 7 has a shape disposed to fill only the space between the groove 210 and the cooling part 300 disposed along the curve of the groove 210. Due to this structural difference, as compared to FIG. 6, FIG. 7 has the effects of minimizing the second heat transfer part 500, and of increasing the area where the second heat transfer part 500 and the cooling part 300 come into contact with each other, thereby improving the cooling efficiency due to an increase in the cooling area.

The first heat transfer part 400 in the present disclosure is made of a material capable of fixing the battery cell 100 and conducting heat, and may be made of a conductive adhesive; and the second heat transfer part 500 may be made of a heat dissipating grease, a conductive adhesive or a heat dissipating pad, but is not limited thereto.

In addition, a battery pack according to one embodiment of the present disclosure may include a battery module 10, wherein the battery module 10 includes: a plurality of battery cells 100, a housing 200 accommodating the plurality of battery cells 100, and a cooling part 300 disposed on an outer surface of the housing 200, wherein the battery module includes a first heat transfer part 400 formed on an inner surface of the housing 200 so as to make contact with one side of the plurality of battery cells 100, and wherein the housing 200 may have a curved portion in accordance with a curved shape of the plurality of battery cells 100.

As described above, the technical significance of the present disclosure resides in that in the process of heat transfer between an inside of the secondary battery and a cooling part disposed outside the secondary battery, the thermal resistance is lowered by increasing a heat transfer area of the contacted portion and reducing a heat transfer path, thereby improving a cooling performance of a battery module and thus, efficiently dissipate heat inside the secondary battery.

The battery module described above may be included in the battery pack. The battery pack may have a structure in which one or more battery modules according to the present embodiment are collected, and then packed by adding a battery management system (BMS) and a cooling device to manage the temperature or voltage of the battery.

The battery pack can be applied to various devices. Such a device may be applied to vehicles such as an electric bicycle, an electric vehicle, or a hybrid vehicle, but the present disclosure is not limited thereto, and can be applied to various devices capable of using a battery module, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

10: battery module
100: battery cell
200: housing
210: groove
300: cooling part
310: refrigerant
400: first heat transfer part
500: second heat transfer part

The invention claimed is:

1. A battery module comprising:
a plurality of battery cells;
a housing accommodating the plurality of battery cells, the housing extending completely around an outer periphery of the plurality of battery cells, such that the plurality of battery cells is disposed within an interior space defined within the housing;
a cooling part disposed at an outer surface of the housing; and
a first heat transfer part disposed on an inner surface of the housing in contact with a surface of an end of each of the plurality of battery cells,
wherein an inner surface of the housing has a curved portion having a curved shape conforming to a curved shape of the ends of each of the plurality of battery cells,
wherein an inner surface of the first heat transfer part has a curved shape that is the same as the curved shape of the ends of each of the plurality of battery cells,
wherein an outer surface of the first heat transfer part has a curved shape that is the same as the curved shape of the inner surface of the housing.

2. The battery module of claim 1, wherein the first heat transfer part contacts the curved portion of the housing.

3. The battery module of claim 1, wherein the battery module further comprises a second heat transfer part disposed between the outer surface of the housing and the cooling part in contact with the outer surface of the housing.

4. The battery module of claim 3, wherein the second heat transfer part has a planar shape.

5. The battery module of claim 3, wherein the outer surface of the housing has a curved shape, and the second heat transfer part is disposed inside a groove formed by the curved shape.

6. The battery module of claim 5, wherein the second heat transfer part has a rod shape.

7. The battery module of claim 3, wherein the second heat transfer part is composed of a plurality of parts, the outer surface of the housing has a curved shape, and the plurality of parts are spaced apart from each other and are inserted into a plurality of grooves formed by the curved shape, respectively.

8. The battery module of claim 3, wherein the outer surface of the housing has a curved shape conforming to the curved shape of the ends of the plurality of battery cells.

9. The battery module of claim 1, wherein the first heat transfer part has a curved shape conforming to the curved shape of the housing.

10. The battery module of claim 1, wherein the first heat transfer part is a conductive adhesive.

11. The battery module of claim 1, wherein the second heat transfer part is one of a heat dissipating grease, a conductive adhesive, and a heat dissipating pad.

12. A battery pack comprising the battery module according to claim 1.

13. A battery module comprising:
a plurality of battery cells;
a housing accommodating the plurality of battery cells, the housing extending completely around an outer periphery of the plurality of battery cells, such that the plurality of battery cells is disposed within an interior space defined within the housing;
a cooling part disposed at an outer surface of the housing; and
a first heat transfer part disposed on an inner surface of the housing in contact with a surface of an end of each of the plurality of battery cells,
wherein an inner surface of the housing has a curved portion having a curved shape conforming to a curved shape of the ends of each of the plurality of battery cells,
wherein an inner surface of the first heat transfer part has a curved shape that is the same as the curved shape of the ends of each of the plurality of battery cells,
wherein an outer surface of the first heat transfer part has a curved shape that is the same as the curved shape of the inner surface of the housing, and
wherein an outer surface of the housing has a curved shape conforming to the curved shape of the ends of each of the plurality of battery cells.

* * * * *